United States Patent [19]
Low et al.

[11] 3,891,452
[45] June 24, 1975

[54] REFRACTORY PORCELAIN ENAMEL PASSIVE CONTROL COATING FOR HIGH TEMPERATURE ALLOYS

[76] Inventors: George M. Low, Administrator of the National Aeronautics and Space Administration, with respect to an invention of Herman Levin, Canoga Park; Byron H. Auker, Hermosa; Michael N. Gardos, Torrance, all of Calif.

[22] Filed: Apr. 11, 1973

[21] Appl. No.: 350,250

[52] U.S. Cl. ..................... 106/48; 106/54; 117/129
[51] Int. Cl. .......................... C03c 7/00; C03c 3/14
[58] Field of Search ............................... 106/48, 52

[56] References Cited
UNITED STATES PATENTS

| | | | |
|---|---|---|---|
| 2,294,931 | 9/1942 | Paquet | 106/48 |
| 2,324,812 | 7/1943 | Bahnsen et al. | 106/48 |
| 2,326,348 | 8/1943 | Frost et al. | 106/48 |
| 2,483,393 | 10/1949 | Baldwin | 106/48 |
| 3,703,390 | 11/1972 | Girard et al. | 106/48 |
| 3,709,717 | 1/1973 | Hamling | 106/48 |

*Primary Examiner*—Winston A. Douglas
*Assistant Examiner*—Mark Bell
*Attorney, Agent, or Firm*—L. D. Wofford, Jr.; Wayland H. Riggins; John R. Manning

[57] ABSTRACT

Porcelain enamel for use as a thermal control coating on high-temperature, nonferrous superalloy substrates is made up of a high-refractory-content boroaluminum silicate glass frit containing zirconium oxide, lithium fluoride, alkali metal and alkaline earth oxide-flux, zinc oxide and a submicron disperse phase of cubic-stabilized zirconium oxide. Enamel coatings embodying the invention exhibit favorable optical properties and a high coefficient of thermal expansion, providing compatibility with substrates of nonferrous superalloys and enabling coated parts of such alloys to withstand severe thermal cycling conditions without cracking.

5 Claims, No Drawings

REFRACTORY PORCELAIN ENAMEL PASSIVE CONTROL COATING FOR HIGH TEMPERATURE ALLOYS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

BACKGROUND OF THE INVENTION

This invention relates to porcelain enamels and to thermal control coatings for high temperature alloy substrates.

One of the materials problems presented in development of reusable space shuttle vehicles is the provision of suitable thermal control coatings for certain exposed surfaces. Coatings for this purpose should have a low solar absorptance ($\alpha_s$) and a high emittance ($\epsilon_H$) in order to provide effective protection from solar radiation, and the concept of reusability requires that such optical properties be maintained after repeated exposure to severe environmental conditions including re-entry heating, dust, rain, salt-spray and other earth contaminants as well as ultraviolet radiation and high vacuum in orbit. In order to meet these requirements, the coating should be easily cleanable so as to allow restoration of optical properties after each mission, and it must be capable of maintaining its physical integrity upon being subjected to severe thermal cycling.

Presently available porcelain enamels, while meeting some of the criteria given above, fail to show the required resistance of thermal cycling when applied to substrates of high-temperature structural metals and alloys suitable for space shuttle vehicle structures. Porcelain enamels have largely been designed for adhesion to low-carbon steel and iron substrates. Enamelling glasses or frits typically have a lower thermal expansion coefficient than substrate metals so that there is some mismatch, even in the case of steel substrates. Thermal expansion values for high-temperature-service structural alloys being considered for space shuttle use such as nonferrous superalloys or other alloys based on nickel, titanium or columbium are some ten to twenty per cent higher than for steels; thus the thermal expansion mismatch is exaggerated and the tendency of porcelain enamel coatings to crack upon thermal cycling is increased. Resort to high-fusion-temperature glass, in order to exploit the high service temperature potential of superalloys, generally requires a glass composition which exhibits low thermal expansion. An unacceptable trade-off of enamel service temperature with thermal shock resistance therefore has been presented. In addition, improvements to optical properties of existing enamels are required to obtain the desired reflectance in the solar wavelength region, 0.2 to 2.5 microns. In this regard, conventional titania-opacified white enamels reflect about 65 per cent of solar radiation in contrast to the minimum value of 80 per cent needed for passive thermal control coatings.

SUMMARY OF THE INVENTION

In the present invention a high-refractory-content boroaluminum silicate glass frit for porcelain enamels is formulated to contain an amount of zirconium oxide such as to exceed frit solubility at smelting temperature, along with specified amounts of alkali and alkaline earth oxide flux, zinc oxide and fluoride. Porcelain enamel suitable for thermal control coating applications can be obtained by combining this frit with a submicron disperse phase of cubic-stabilized zirconium oxide. Enamels of this composition, when applied to a substrate of a nonferrous superalloy and fused at high temperature, show good adherence and mechanical integrity after repeated exposure to extreme thermal cycling by virtue of avoiding the thermal expansion mismatch of previous porcelain enamels with superalloys. Effective optical properties for thermal control purposes are also provided, in particular, a high emittance and low absorptance of solar radiation. Although various other factors contribute to effectiveness of the present coatings, use of a high zirconium oxide content in the frit induces production of crystallities small enough to enhance opacification, and the cubic-stabilized submicron zirconium oxide disperse phase provides for higher thermal expansion, consistent with efficient backscatter of all included radiation wavelengths in the solar spectrum.

It is therefore an object of this invention to provide thermal control coatings for use on substrates of nonferrous, high-temperature-service alloys.

Another object is to provide porcelain enamels capable of withstanding thermal cycling to extreme temperatures.

Still another object is to provide porcelain enamel coatings having a low solar absorptance and a high reflectance.

Yet another object is to provide porcelain enamel coatings having a minimum thermal expansion mismatch with superalloy substrates.

Other objects and advantages of the invention will be apparent from the following detailed description.

DESCRIPTION OF THE PREFERRED EMBODIMENTS

Porcelain enamel compositions of the present invention are made of a high-refractory-content glass frit and a submicron disperse phase or mill additive of zirconium oxide. Broadly stated, the glass frit can include a refractory oxide content (total $SiO_2 + Al_2O_3 + ZrO_2$) of 61 to 70 weight per cent, with $ZrO_2$ present in an amount of 10 to 20 weight per cent; a basic flux component, $R_2O \cdot RO$, where $R_2O$ is any combination of oxides selected from the group consisting of lithium oxide, sodium oxide and potassium oxide and RO is a combination of oxides selected from the group consisting of magnesium oxide, calcium oxide, strontium oxide and barium oxide, with barium oxide forming over half the RO combination, and the amount of $R_2O \cdot RO$ flux being 1 mole per 3.6 to 4.0 moles of refractory oxide; zinc oxide in an amount of 2 to 6 weight per cent; boron oxide, $B_2O_3$, in an amount of 4 to 9 weight per cent; and a fluoride selected from the group consisting of LiF, NaF, $CaF_2$, $Na_3AlF_6$ and $Na_2SiF_6$ in an amount sufficient to provide a total fluoride content, as $F_2$, of 2 to 7.4 weight per cent, a major proportion of the fluoride being in the form of lithium fluoride and the metal constituent of the fluoride compound being included in the flux or refractory component to which it contributes.

In a preferred embodiment, sodium oxide is employed for the alkali oxide portion of the flux, barium oxide and calcium oxide for alkaline earth oxide portions thereof, and lithium fluoride for the fluoride component. The composition and amounts of the various components of preferred frit mixtures are given by the following:

Table I

| Component | Weight Percent |
|---|---|
| $SiO_2$ | 35 to 50 |
| $B_2O_3$ | 4 to 9 |
| $Al_2O_3$ | 6 to 9.5 |
| $ZrO_2$ | 10 to 20 |
| $Na_2O$ | 6 to 7 |
| CaO | 1 to 2 |
| BaO | 8.5 to 9.8 |
| ZnO | 2 to 6 |
| LiF | 4 to 10.2 |

Within the limits given in the above table, a particularly preferred frit composition is as follows, in weight per cent: $SiO_2$, 41; $B_2O_3$, 6.8; $Al_2O_3$, 6.0; $ZrO_2$, 17.7; $Na_2O$, 6; CaO, 1.0; BaO, 9.5; ZnO, 6.0; and LiF, 6.0.

These compositions provide a high-fusion-temperature frit (975° to 1,100°C) owing to the high content of refractory oxides. The amount of zirconium oxide (10 to 20 weight per cent) is selected to exceed its solubility in the melt and induce crystallization as zirconia and/or zircon upon quenching. The resulting crystallites are small enough to enhance opacification.

The relatively high content of barium oxide in the flux, in combination with a high fluoride content, contributes to attainment of a high coefficient of thermal expansion, consistent with favorable opacification and adhesion-promotion qualities.

A disperse phase of mill additive zirconium oxide is employed in combination with the frit compositions described above. A relatively high proportion of mill additive, 10 to 50 parts by weight per 100 parts by weight of frit, is required to obtain the desired properties, and best results are realized by an amount sufficient to provide 18 to 20 volume per cent disperse phase in fired coatings. Cubic-stabilized zirconium oxide is employed for the disperse phase owing to its high coefficient of thermal expansion, $110 \times 10^{-7}/°C$ as compared to $72 \times 10^{-7}/°C$ for monoclinic zirconium oxide over the temperature range from 20° to 700°C. Zirconuium oxide which has been stabilized by doping with 5 to 10 weight per cent yttrium is preferred because yttria exhibits negative solubility in the base frit when firing the enamel. Calciastabilized zirconium oxide is less suitable owing to potentially deleterious effects of calcia solubility including increased fluxing of the enamel and reversion of some zirconium oxide to monoclinic form.

The zirconium oxide is provided in the form of submicronsize particles, preferably having an average diameter in the range of 0.3 to 0.6 micron. Particles in this size range, and with the relatively high refractive index of zirconium oxide, $n = 2.2$, provide superior backscatter in a condensed particle system. In view of the high optical transmission of zirconium oxide over the solar spectrum, 0.2 to 2.5 microns, efficient backscatter of all included wavelengths is produced. Superior opacity and whiteness is thus imparted to the fired enamel.

Coating compositions embodying the invention can be prepared and applied by conventional techniques. In a preferred procedure a glass frit is prepared by smelting a mixture of the specified components in a refractory crucible. The smelted mixture is quenched in water at room temperature and the resulting coarse particles are recovered and ovendried. Coarse frit particles are then milled to an effective particle size distribution of approximately 20 to 74 microns, centered at approximately 33 microns. An aqueous slurry or slip suitable for application in coating form is prepared by milling a mixture of the glass particles and the disperse phase zirconium oxide and adding sufficient water to obtain the required consistency. Various agents may be added to this slip to optimize the intimate dispersion of the solid phases and to control its rheological properties consistent with either spray or dip application to a substrate. Such agents and their varying combinations and concentrations are well known to one experienced in the art, typical ones being organic electrolytes, inorganic electrolytes, natural gums, synthetic gums, selected clays and others. Water is the conventional dispersion medium but may be supplemented or replaced by other organic or inorganic liquids appropriate to a given application. The slip is then applied by means such as spraying onto the metal substrate to be coated. After allowing the coating to dry, preferably in room temperature air for a period of 18 to 24 hours, fused enamel is obtained by firing a high temperature of 975° to 1,100°C being required owing to the refractory nature of the present compositions.

Fused enamel coatings embodying the invention show thermal expansion values in the range of interest for high-temperature superalloys, that is, $110$ to $140 \times 10^{-7}/°C$. Expansion values for such alloys are somewhat higher, but the enamel should remain slightly lower so as to ensure compressive rather than tensile residual stress upon cooling.

Although other coating thicknesses can be used, best results are obtained at a fired coating thickness of 0.015 to 0.023 centimeter. Thinner coatings provide effective optical properties initially, but they are less resistant to damage upon thermal cycling.

Coatings embodying the invention have been applied to sample substrates of the nickel-base alloy available under the trade name "Hastelloy X" to a fired thickness of 0.02 to 0.023 centimeter and subjected to analysis and testing. Solar absorptance ($\alpha_s$) values of 0.18 to 0.20 were found. Initial adherence of the coating was good, and coating adherence and integrity were maintained after repeated thermal soak at 920°C and thermal shock from 920°C to room temperature. Tests under ultraviolet radiation in vacuum indicated favorable resistance to such conditions. Good cleanability and re-usability were also found.

While the invention has been described primarily in terms of a thermal control coating for space vehicle use, it is not to be understood as so limited, but can be profitably used in other coating applications involving high-thermal-expansion substrates and severe thermal shock conditions. Furthermore, various changes and modifications to the compositions and procedures described above may be made by one skilled in the art without departing from the invention.

What is claimed is:

1. A porcelain enamel coating composition which exhibits a low absorptance and a high emittance of solar radiation and a high coefficient of thermal expansion, and maintains its physical integrity upon subjection to severe thermal cycling, comprising:
   a frit comprising:

|  | Weight Percent |
|---|---|
| $SiO_2$ | 35 to 50 |
| $B_2O_3$ | 4 to 9 |
| $Al_2O_3$ | 6 to 9.5 |
| $ZrO_2$ | 10 to 20 |
| $Na_2O$ | 6 to 7 |
| CaO | 1 to 2 |
| BaO | 8.5 to 9.8 |
| ZnO | 2 to 6 |
| LiF | 4 to 10.2 | and a disperse phase of cubic-stabilized, submicron-particle-size zirconium oxide, the amount of the disperse phase is 10–50 weight percent of said frit.

2. The composition of claim 1 wherein said zirconium oxide is yttrium-doped.

3. The composition of claim 1 wherein said zirconium oxide dispersed phase is provided in an amount sufficient to produce a volume concentration thereof in a fused coating of 18 to 20 per cent.

4. The composition of claim 3 wherein the average particle size of said zirconium oxide disperse phase is 0.3 to 0.6 micron.

5. A porcelain enamel composition for use as a thermal control coating on nonferrous alloy substrates having a high coefficient of thermal expansion comprising a frit comprising:

| $SiO_2$ | 41 |
|---|---|
| $B_2O_3$ | 6.8 |
| $Al_2O_3$ | 6.0 |
| $ZrO_2$ | 17.7 |
| $Na_2O$ | 6.0 |
| CaO | 1.0 |
| BaO | 9.5 |
| ZnO | 6.0 |
| LiF | 6.0 | and a disperse phase of yttrium-stabilized zirconium oxide having an average particle size of 0.3 to 0.6 micron, the amount of said disperse phase being sufficient to provide a volume concentration in a fused coating of 18 to 20 per cent.

* * * * *